Patented Feb. 17, 1931

1,793,021

UNITED STATES PATENT OFFICE

WALTER SCHOELLER, OF BERLIN-WESTEND, AND HANS GEORG ALLARDT, OF BERLIN-REINICKENDORF-WEST, GERMANY, ASSIGNORS TO THE FIRM SCHERING-KAHLBAUM A. G., OF BERLIN, GERMANY

ALKALI SALTS OF HALOGEN HYDROXYBENZOIC ACID ESTERS

No Drawing. Application filed August 1, 1929, Serial No. 382,829, and in Germany August 10, 1928.

Our invention refers to new chemical compounds adapted for use as disinfectants and preservatives, which are obtained by acting on halogen hydroxybenzoic acid esters with an alkali. We have found that there are obtained in this reaction salts having a neutral reaction and being comparatively soluble in water, the solutions of which have a disinfecting effect.

The constitution of these salts can be expressed by the general formula $$Me-O-(C_6X_4)-COOR,$$

wherein Me is an alkali-forming metal, $(C_6X_4)$ a benzene nucleus, the hydrogen atoms in which are partly substituted by halogen atoms, and R is an akyl.

These salts dissolve in water with neutral reaction. They are comparatively soluble in hot alcohol, insoluble in petroleum ether and benzene and have a disinfecting effect.

The salts can be obtained according to well known methods for instance by reacting on the corresponding acids with an alkali or an alkali carbonate.

Example 1

32 parts by weight 3.5-dibromo-4-hydroxybenzoic acid ethyl ester are dissolved in a solution of 5.3 parts sodium carbonate in 1500 parts water and to the solution are added 450 parts sodium chloride. The mixture is stirred until all the sodium chloride has dissolved. There separates out in fine needles the sodium salt of 3.5-dibromo-4-hydroxybenzoic acid ethyl ester. The needles are freed from liquor by sucking and are washed with a solution of common salt and well dried. The dry substance is boiled with 300 parts absolute alcohol, free from the sodium chloride by filtration, while still hot, and the filtrate is concentrated by evaporation. On cooling the sodium salt crystallizes out in the form of needles. It dissolves in cold water in the proportion of 5 parts of the salt to 100 parts water. It is insoluble in ether and petroleum ether and comparatively soluble in hot alcohol.

Example 2

24.5 parts 3-bromo-4-hydroxybenzoic acid ethyl ester are dissolved in 5.3 parts sodium carbonate and 500 parts water and the solution is evaporated to dryness. For purification purposes the sodium salt of the 3-bromo-4-hydroxybenzoic acid ethyl ester can be recrystallized from alcohol. It has the form of fine needles which have neutral reaction and are readily soluble in water, comparatively soluble in hot alcohol and insoluble in petroleum ether.

Example 3

In the manner discribed with reference to Example 2 reaction between 29.6 parts by weight 3-iodo-4-hydroxybenzoic acid ethyl ester and 5.3 parts sodium carbonate will result in the formation of the sodium salt of the 3-iodo-4-hydroxybenzoic acid ethyl ester which crystallizes out in the form of fine needles, dissolves readily in water with neutral reaction and is insoluble in petroleum ether and benzene.

Various changes may be made in the details disclosed in the foregoing specification without departing from the invention or sacrificing the advantages thereof.

We claim:—

1. As new products the alkali salts of the halogen hydroxybenzoic acid esters having the general formula

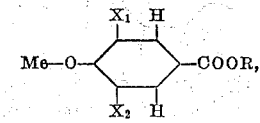

wherein Me is an alkali-forming metal, $X_1$ a halogen atom, $X_2$ a halogen atom or a hydrogen atom, and R an alkyl group, these salts being soluble in water with neutral reaction, comparatively soluble in hot alcohol, insoluble in petroleum ether and benzene and have a disinfecting action.

2. As new products the alkali salts of the halogen hydroxybenzoic acid esters having the general formula

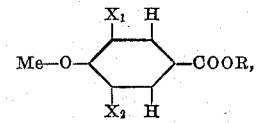

wherein Me is an alkali-forming metal, $X_1$ a halogen atom, $X_2$ a halogen atom or a hydrogen atom, and R an ethyl group, these salts being soluble in water with neutral reaction, comparatively soluble in hot alcohol, insoluble in petroleum ether and benzene and have a disinfecting action.

3. As new products the alkali salts of the halogen hydroxybenzoic acid esters having the general formula

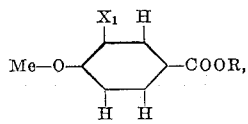

wherein Me is an alkali-forming metal, $X_1$ a halogen atom, and R an alkyl group.

4. As new products the alkali salts of the halogen hydroxybenzoic acid esters having the general formula

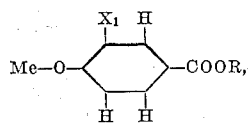

wherein Me is an alkali-forming metal, $X_1$ a halogen atom, and R an ethyl group.

5. As new compounds the alkali salts of the 3-iodo-4-hydroxybenzoic acid ethyl ester having the formula

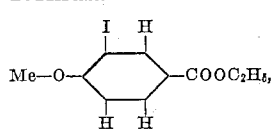

wherein Me is an alkali-forming metal, these salts crystallizing in fine needles, dissolving readily in water with neutral reaction and being insoluble in petroleum ether and benzene and having a disinfecting action.

6. As new compound the sodium salt of the 3-iodo-4-hydroxybenzoic acid ethyl ester having the formula

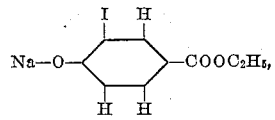

this salt crystallizing in fine needles, dissolving readily in water with neutral reaction and being insoluble in petroleum ether and benzene and having a disinfecting action.

In testimony whereof we affix our signatures.

WALTER SCHOELLER.
HANS GEORG ALLARDT.